UNITED STATES PATENT OFFICE 2,547,988

PROCESS FOR IMPROVING THE FOAM OF FERMENTED MALT BEVERAGES AND PRODUCT OBTAINED THEREBY

James S. Wallerstein, Arthur L. Schade, and Hilton B. Levy, New York, N. Y., assignors, by mesne assignments, to Wallerstein Company, Inc., New York, N. Y., a corporation of New York No Drawing. Application February 11, 1947, Serial No. 727,940

14 Claims. (Cl. 99—48)

The present invention relates to fermented malt beverages and more particularly to beverages of this type characterized by the capacity for forming a stable, that is, a long-lived foam.

Fermented malt beverages include beer, ale, porter, stout, etc. The present invention will be further described in connection with the treatment of beer, as this beverage is by far the most popular of the fermented malt drinks, but it will be understood that the improvements described hereinbelow can be applied to the other known fermented malt beverages.

Fermented malt beverages depend for their appeal on their body, palatability, appearance (i. e. color, clarity) and on the foam head which they form on pouring. Beers with a persistent foam are much preferred by the beer drinker to beers that have a short-lived foam.

The formation of a large initial volume of foam may be readily controlled, as, for example, by the manner of pouring the beverage or by the degree of carbonation. It is extremely difficult, however, to develop a persistent or enduring foam which maintains its head for a period of many minutes—the period of time which may be required for consumption of the beer—and at the same time avoid impairing the brilliancy, palatability or flavor of the beverage.

Beer foam is produced by the presence in beer of certain proteins, gums, hop resins, minute traces of esters, organic acids and higher alcohols. These materials lower the surface tension, and at the surface of the beverage they bring about the formation of a firm interlocking network which entangles or entraps the gas bubbles as they rise to the surface. The effect is to form viscous envelopes around the bubbles, and thus to prevent them from coalescing and breaking together into larger bubbles which would disrupt the foam. This stabilizing effect makes beer foam much more enduring than the temporary froth produced in carbonated soft drinks.

It is an important objective of the brewing art to produce beers with persistent and stable foams. Any factor by which this may be accomplished without disadvantageously affecting the quality, flavor, or appearance of the beer can be regarded as a significant advance in such art.

It is accordingly the general object of the present invention to provide fermented malt beverages whose foam-head is longer-lasting in character than the foam-head produced by the normal components of these beverages as at present manufactured.

It is a further object of the invention to improve the lasting qualities of the foam-head of fermented beverages by adding to such beverages at any suitable time in the course of their manufacture, but preferably after the fermenting and initial or coarse filtering, but prior to the storage period, a small quantity of a soluble non-toxic carboxy-methyl cellulose, preferably in the form of its alkali metal salt, such as the sodium and potassium salts.

We have now discovered that the foam of beer may be prolonged in a simple and economical manner by the addition to the beer of small amounts of a water-soluble, heat-stable form of carboxy-methyl cellulose, as, for example, the sodium salt of such material. This is commonly called cellulose gum, and is a completely harmless and edible material. When solutions of, for example, sodium carboxy-methyl cellulose are added to beer in a concentration of 5 to 200 parts per million, the duration of the foam is greatly increased and a persistent froth is produced which endures for as much as several hours. Preparations of the sodium carboxy-methyl cellulose are particularly valuable when they are of a high viscosity type, and they increase the foam duration period many times. A suitable grade is that sold as "high viscosity" by the Hercules Powder Co. of Wilmington, Delaware.

Carboxy-methyl cellulose can under proper conditions be added to beer without in any way impairing its stability or brilliance, nor in any other way unfavorably affecting its quality. For this purpose, the preparation is homogenized in a colloid mill and added in such form to the beer at least 24 hours and advantageously several days prior to final filtration, and preferably at the beginning of storage. Filtration does not eliminate the foam-forming effect of the alkali metal carboxy-methyl cellulose. However, if filtration is not carried out the sodium carboxy-methyl cellulose may in certain cases give rise to a subsequent undesirable opalescence in the beer. Homogenization of the preparation will tend to reduce or eliminate any opalescence formation in the beer.

The potassium salt and other alkali metal salts of carboxy-methyl cellulose may be employed in place of the sodium salt. The ammonium salt, however, even though it is soluble in water, is not desirable because it is unstable and decomposes at high temperatures under the conditions of pasteurization of the beer, and unfavorably affects the flavor of the products.

The following examples illustrate satisfactory procedures for carrying out the invention, but it will be understood that they are presented purely for purposes of illustration and not as indicating the limits of the invention.

*Example 1*

Beer is fermented in the usual way, and filtered through a coarse filter. To each liter of the resultant turbid solution are added 10 cc. of a homogenized 1% solution of high viscosity sodium carboxy-methyl cellulose. After standing for 2-3 days, the suspension is filtered with the aid of a clarifying agent, such as Celite, yielding a brilliant solution.

*Example 2*

Beer is fermented in the usual way and filtered clear. To each liter of the filtrate are added 10 cc. of a homogenized 1% solution of high viscosity sodium carboxy-methyl cellulose. The beer may then be refiltered if necessary to remove any slight haze.

While the carboxy-methyl cellulose can be added during the fermentation or even to the mash prior to the fermentation, we prefer to add it after the fermentation is completed, both to avoid loss of the material by adsorption or absorption by the yeast and other solid material, and to avoid increase of the foaming during fermentation.

We claim:

1. The method of improving the foam of fermented malt beverages which comprises adding to the beverage a solution of a water-soluble, heat stable, carboxy-methyl cellulose.

2. The method according to claim 1, in which the concentration of carboxy-methyl cellulose in the beverage is of the order of 5 to 200 parts per million.

3. The method according to claim 1, in which the carboxy-methyl cellulose is homogenized before mixing with the beverage.

4. The method of claim 1, in which the carboxy-methyl cellulose is added in the period after completion of the fermentation, but at least 24 hours before final filtration of the fermented brew.

5. The method of claim 1, in which the carboxy-methyl cellulose is added in the form of its alkali metal salt.

6. The method of claim 1, in which the carboxy-methyl cellulose is added in the form of its sodium salt.

7. The method of claim 1, in which carboxy-methyl cellulose is added in the form of its potassium salt.

8. The method of claim 1, in which the carboxy-methyl cellulose is of a high viscosity.

9. A fermented malt beverage capable of forming a highly stable foam and containing a small quantity of a soluble carboxy-methyl cellulose.

10. A fermented malt beverage capable of forming a highly stable foam and containing a quantity of alkali metal carboxy-methyl cellulose.

11. A fermented malt beverage capable of forming a highly stable foam and containing a quantity of sodium carboxy-methyl cellulose.

12. A fermented malt beverage capable of forming a highly stable foam and containing a quantity of potassium carboxy-methyl cellulose.

13. A fermented malt beverage capable of forming a highly stable foam and containing a water-soluble, heat-stable, carboxy-methyl cellulose in quantity of the order of 5 to 200 parts per million.

14. A clear, heat-pasteurized beer characterized by a highly stable foam and containing approximately 100 parts of sodium carboxy-methyl cellulose per million.

JAMES S. WALLERSTEIN.
ARTHUR L. SCHADE.
HILTON B. LEVY.

REFERENCES CITED

The following references are of record in the file of this patent:

UNITED STATES PATENTS

| Number | Name | Date |
|---|---|---|
| 2,179,457 | Voss | Nov. 7, 1939 |
| 2,395,061 | Musher | Feb. 19, 1946 |

OTHER REFERENCES

A. E. Hiss; "The Standard Manual of Soda and Other Beverages," published 1897 by G. P. Engelhard & Co., Chicago, pages 33, 34.

Industrial & Engineering Chemistry, Oct. 1945, pages 943 to 947.

Ind. & Eng., Sept. 1937, page 985.

Chemical Abstracts, vol. 36, pages 1491, 1942.

In re Mason 592 O. G. 415.